Patented Sept. 18, 1928.

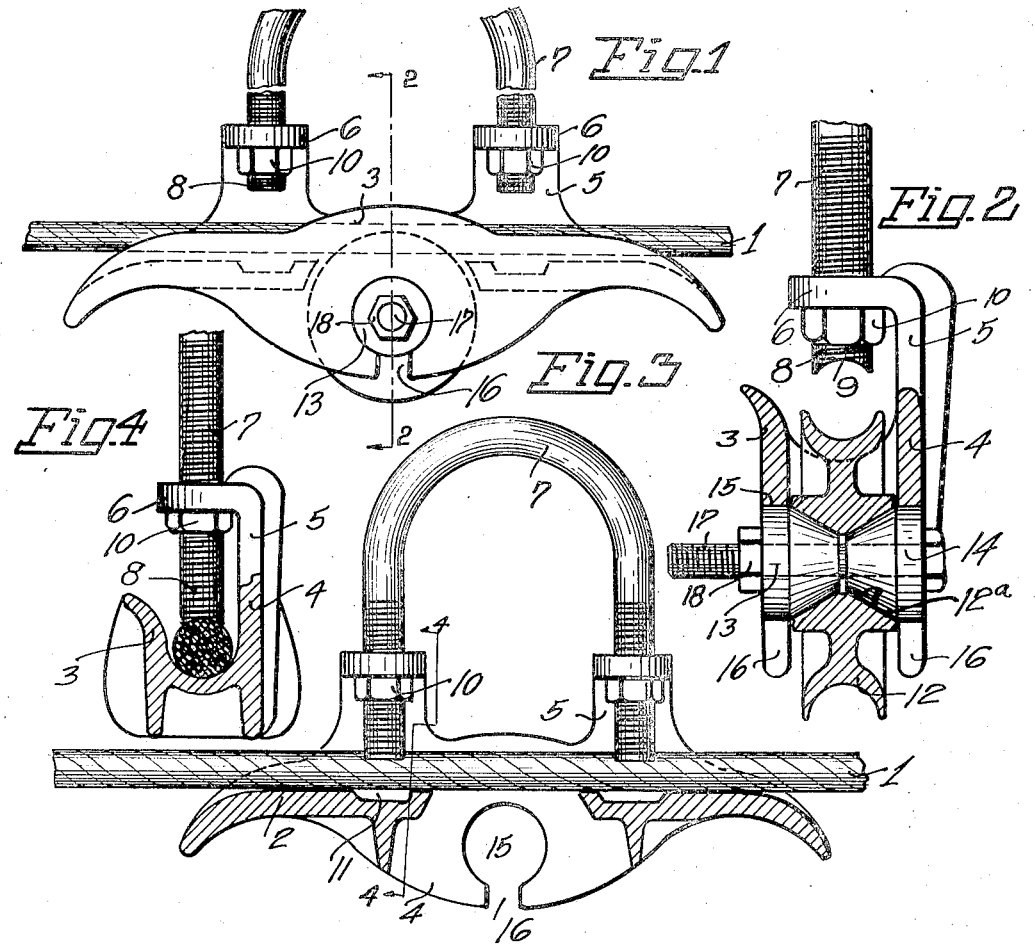

1,684,784

UNITED STATES PATENT OFFICE.

CHARLES J. WELLER, OF COULEE, WASHINGTON.

WIRE CLAMP.

Application filed January 7, 1927. Serial No. 159,563.

My present invention relates to improvements in wire clamps which are designed especially for use in threading or passing wires or cables from pole to pole in the construction work of telephone, electric transmission, and other lines. As is well known in the construction of power, telephone, and similar lines, difficulty is encountered, in pulling the heavy cables or wires from pole to pole, and in uniformly distributing the slack in the cables or wires between successive pole to pole spans, due to friction between the supporting or suspending members and the cables or wires.

In this construction work it is customary to deliver the wires or cables to the power line location at intervals of say half a mile, with the wires or cables in lengths containing about a mile of material. This wire or cable is then unwound from a rack, spool or reel, by hitching a team or other power to the end of the wire and dragging it along the right of way at the base of the poles and thus unwinding it from the reels. The reels are held in one location in such manner that they turn freely upon an axle provided for the purpose. After the end of the wire has been drawn past a pole it is customary to place it in a pulley or dolly block, which is in turn drawn up and fastened to the underside of the cross arm on the pole, either by an eyebolt or directly to the strain insulator, thus raising the wire off the ground. A grooved pulley or wheel is employed to carry the wire and reduce friction.

After the length of wire has been fully drawn out, it is fastened to the last succeeding length, and then drawn or stretched up to the proper tension by a pull applied at the forward end. After proper tension has been reached, it is customary to lift the wires by means of ropes and pulleys at each point of support, and replace the pulley or dolly wheel (over which the wire or cable has been drawn into position) by a permanent suspension wire clamp, the pulley or dolly wheel being lowered to the ground.

In carrying out my invention the suspension clamp and frame supporting the pulley or dolly wheel are combined for use, and after proper tension has been secured and the pulley wheel removed, the frame supporting the wheel then becomes the suspending clamp and the wire is readily clamped into permanent position by tightening the nuts provided for the purpose.

The invention consists in certain novel combinations and arrangements of parts as will hereinafter be more fully set forth and claimed. In the accompanying drawings I have illustrated one example of the physical embodiment of my invention wherein the parts are combined and arranged according to the best mode I have thus far devised for the practical application of the principles of my invention.

Figure 1 is a view in side elevation showing one of the suspending clamps in use before the cable or wire is clamped in place.

Figure 2 is a vertical transverse sectional view at line 2—2 of Figure 1.

Figure 3 is a vertical sectional view showing the suspending clamp in actual use on a cable and with the guide pulley removed.

Figure 4 is a detail sectional view at line 4—4 of Figure 3.

In the preferred form of my invention as illustrated in the drawings, I have designated the wire or cable as 1 and this is supported on a bracket 2, one of these brackets being used on each of the poles of the line. Each bracket is fashioned with side plates 3 and 4, and a pair of bracket arms 5, integral with the side plate 4, extend upwardly above the bracket. At the upper ends of these arms 5 are arranged integral, perforated lugs 6, which project over the longitudinal center of the bracket. These two spaced lugs are designed to accommodate a U-bolt 7 whose threaded ends 8 are passed through the perforated lugs 6. The faces of the opposite ends of the U-bolt are concaved as at 9 to conform to the contour of the cable or wire, and the bracket is also concaved or grooved to conform to the contour of the cable in order that the latter may be clamped between the bracket and these ends of the U-bolt, as indicated in Figures 3 and 4.

The U-bolt is provided with nuts 10, and as seen in Figure 1, these are utilized to suspend the bracket before the cable is ready for clamping. The nuts on the ends of the U-bolt are located beneath the perforated lugs 6, and as seen in Figure 1, when the cable 1 is being placed in position, the nuts are turned on the threaded ends to support the bracket with the ends of the U-bolt spaced from the cable, in order that the latter may move freely longitudinally of the bracket.

It will be understood of course that the U-bolt 7 forms a suspension yoke and that it is supported or suspended by a hook, eyebolt, or other device from the insulator or cross arm of the pole. The U-bolt 7 forms a permanent suspending yoke for the suspending clamp, one of the latter being used on each pole.

As seen in Figure 3 the bracket is provided with pockets or depressions 11 located directly beneath the ends of the U-bolt, and the cable is adapted to be bent into these depressions by pressure from the U-bolt when the nuts 10 are turned against the flanges or lugs 6. By turning the nuts against the undersides of these perforated lugs, it will be apparent that the concave faces of the bolt ends are caused to contact with the top of the cable or wire, and the cable or wire is then bent into these pockets or depressions. By thus bending the cable the frictional engagement of the bracket and cable is increased and the cable or wire is securely clamped or anchored against longitudinal movement with relation to the bracket.

In putting up the wire or cable, a guide pulley 12 is temporarily used. This pulley is flanged or grooved to accommodate the cable or wire and is provided with a pair of removable bearing cones 13 and 14, which are adapted to fit into complementary holes 15 in the side plates of the bracket, and below each of these circular holes 15 a slot 16 is provided, which extends to the bottom of the side plates of the bracket. A bolt 17 is used to secure the two bearing cones in the bracket and they are clamped in place by the nut 18 on the bolt.

The bolt 17 remains in the two cones, which latter are drawn together or separated by tightening or loosening the nut 18 on the bolt. By separating the cones the pulley may be slid into position by first allowing the bolt to pass sideways into the slots 16 on the sides of the bracket. Tightening the bolt draws the cones together within the double-cone central portion 12ª of the pulley, thus retaining the bearing cones in position.

The nut 18 is turned sufficiently to retain the bearing cones in position and yet permit the pulley 12 to freely revolve on the bearing cones. The cable is threaded through the bracket on this pulley as indicated in Figure 1, and the cable or wire is stretched the full length and then clamped as indicated in Figure 3. After the cable or wire has been clamped in position the pulley 12 is removed for further use, and the remaining device forms a permanent installment or equipment of the power or telephone line. After the cable has been clamped in position, the nut 18 is turned off of its bolt 17, and the bolt is withdrawn from the bearing cones 13 and 14. The cones are then withdrawn from opposite sides of the bracket, and the pulley, which is free, is dropped from between the bracket plates, and is again used on a succeeding bracket.

Numerous advantages accrue from the use of this combination pulley and hanger-clamp or wire clamp, some of which are the elimination of the usual dolly-block that is employed in construction work, which block usually weighs from three to fifteen pounds, and on power line construction three of these dolly-blocks are used to a pole. After proper tension of the wires has been secured and the length uniformly distributed to equalize the slack, the wires can be removed from the pulley wheel, and with facility clamped in position by a single lineman. Present methods of doing this work require the lineman to carry a hand line and pulley up the pole, fasten it to the cross arm of the pole, engage the wire in the hand line, have two ground men to raise the wire while the pulley or dolly-block is removed, and the suspension clamp put in place. By the utilization of the device of my invention the lineman requires only a wrench with which to loosen the bolt of the cones, after which the pulley is removed, and the permanent clamping may be accomplished with the same tool.

Having thus fully described my invention, what I claim as new and desire to secure by Letters Patent is—

1. The combination with a bracket having a pair of spaced pockets and a pair of perforated lugs above said pockets, of a U-bolt having its ends in said perforated lugs, and nuts on the ends of the U-bolt below the perforated lugs.

2. The combination with a bracket having a concave groove in its upper face and spaced pockets, in said groove, bracket arms, and angularly disposed perforated lugs on said arms, of a U-bolt having its ends in said perforated lugs, and nuts on said ends below the perforated lugs.

3. The combination with a bracket, a suspending yoke, and means for clamping a wire between the yoke and bracket, of a guide pulley supported in the bracket, removable bearings for said pulley, and means for clamping said bearings in the bracket.

4. The combination with a bracket, a suspending yoke, and means for clamping a wire between the yoke and bracket, of a removable guide pulley journaled in the bracket, adjustable bearings for said pulley, and means for temporarily clamping said pulley and bearings in the bracket.

In testimony whereof I affix my signature.

CHARLES J. WELLER.